Jan. 18, 1938.   G. R. FESSENDEN   2,105,688
METHOD OF PRESERVING THE NATURAL COLOR IN PLANT SPECIMENS
Filed April 17, 1936
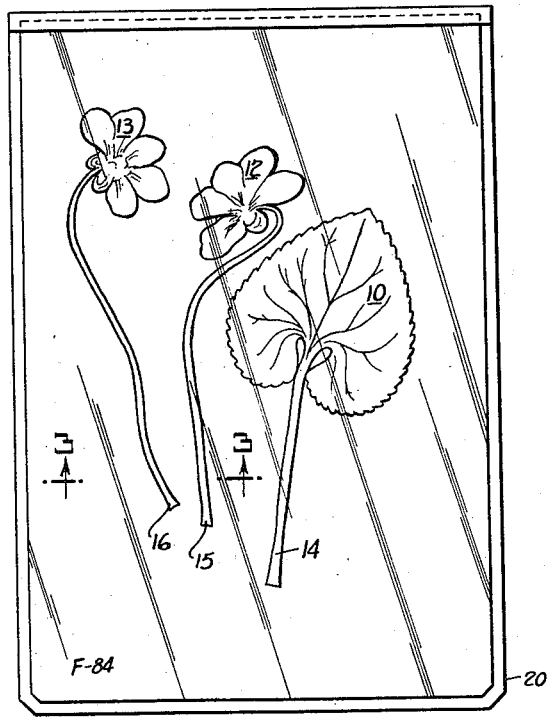
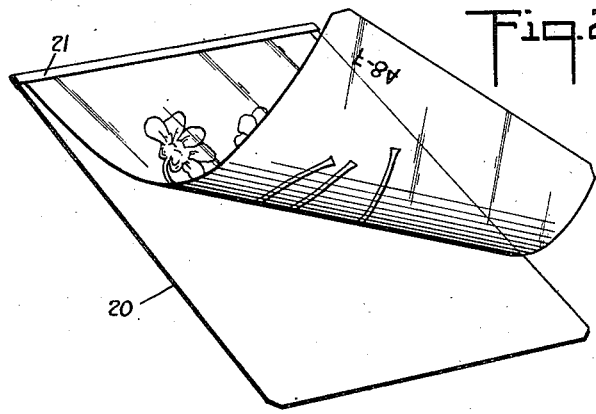
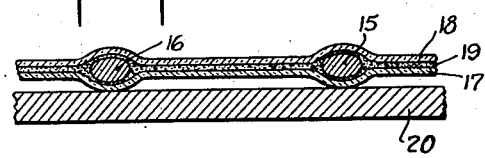
INVENTOR
George R. Fessenden
BY
ATTORNEY Patented Jan. 18, 1938

2,105,688

UNITED STATES PATENT OFFICE

2,105,688

METHOD OF PRESERVING THE NATURAL COLOR IN PLANT SPECIMENS

George R. Fessenden, Mount Vernon, N. Y.

Application April 17, 1936, Serial No. 74,884

2 Claims. (Cl. 35—20)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

The present invention relates to mounted plant specimens and method of mounting the same.

The methods in general use at the present time for preserving or mounting specimens of plants, flowers and leaves consist essentially of dehydrating the specimens by pressing them between dry, absorptive material, usually blotting or pulp paper, and then affixing them by means of glue or gummed strips to sheets of paper or cardboard. Where specimens are to be kept for record or reference purposes, it is customary to immerse or spray them with a poisonous compound, such as bichloride of mercury, as a protection against vermin and insects.

The product resulting from the foregoing process has the disadvantages of being brittle and fragile, and of losing practically all natural color. The present invention eliminates these disadvantages by retaining the natural coloring of the specimen and rendering it durable and non-brittle. It affords protection for the mounted specimen against ordinary mechanical injury through handling and against damage from insects or vermin. The mounted specimen furthermore may be left open to view from both sides, making it possible to study the structure of all parts with one single specimen.

Specimens preserved and mounted by the present process are especially suited for study or display use in schools, museums and other educational institutions, and for all other purposes where retention of natural color and durability of structure are advantageous, such as for nurserymen, seed-growers, florists, botanical drug growers, and distributors, collectors of botanical specimens, garden clubs, nature study, botany, forestry, agricultural or nature conservation organizations.

Further uses are to be found for decorative purposes, as in the place of pictures, paintings, prints or photographs, decoration for lamp shades, trays, screens, curtains, panels or walls; in place of illustrations for books, pamphlets, folders or cards; as copy material for artists, art students or designers, in or on wrappings, boxes or bottles of merchandise such as confections, fruit, flowers, perfumes and soap.

The present process is also advantageous for recording specimens of new horticultural varieties and species; for transporting perishable specimens from distant locations; for international interchange of specimens in their natural color; for microscopic study of plants in natural color; for optical projection of natural-colored specimens on an illuminated screen; and for any and all uses where the retention and display of the natural coloring and structure of any specimen of the vegetable kingdom is required or desirable.

These results are obtained by treating and mounting in the following manner:

The fresh specimen is cleansed with water to remove dirt, grit and extraneous matter, after which it is dehydrated in a manner peculiar to specimens of its class.

If coloring matter, in addition to chlorophyl, is present, the specimen is immersed in a bath of inert hygroscopic material which will not affect the natural color, such as glycerol or sorbitol, used alone, or in combination, with levulose, invert-sugar or other non-crystallizing, substantially colorless, viscous medium. Instead of a bath, one may employ sheets of absorbent material pre-treated therewith.

With readily oxidizable specimens as orchidaceae, ericaceae or ternstroemiaceae, oxidation is checked by addition to the bath (or pre-treated sheets) of a small percentage of hydroquinone, thiourea or other anti-oxidant that is inert with respect to the pigmentation of the specimen.

The specimens are treated concurrently with the foregoing dehydration treatment, or subsequent thereto, with a coagulating or setting compound such as sodium boriphosphate to set the colors and cell tissue and render the specimen more durable and flexible. Where the hydrogen-ion concentration has to be modified to correspond to the value necessary to retain the color and shade of a given pigmentation, the required acidulation or alkalization is obtained through the addition of a small amount of relatively inert reagents such as boric, citric, or tartaric acid, or triethanolamine, sodium bicarbonate or ammonium hydroxide.

Where chlorophyl only is present or predominant, the dehydration may be carried out by displacing the moisture content with a selected inert oily medium, such as a mineral, vegetable, or animal oil, petroleum oil, castor oil, neat's-foot oil, etc. or mixtures of such oils, tricresylphosphate, triethylcitrate, to which is added an emulsifying agent, such as lecithin, to obtain increased dispersion of the water as it is displaced from the cells of the specimen under treatment.

Where necessary to check oxidation during the treatment, as for example with certain ferns, this may be accomplished by adding a small percentage of an anti-oxidant, such as anthracene, phenanthrene, or the like.

Specimens dehydrated in oils or oily media are placed between smooth sheets of absorptive material before being subjected to further stages of treatment.

Specimens of some plants, such as some members of the labiaceae, may be dehydrated in either manner.

The specimen is then laid out in position on a flexible mounting, which may be a sheet of cellulose film (transparent, translucent or opaque), or on a rigid mounting such as glass or other suitable material. Substantially transparent, inert liquid adhesive suited to the mounting medium is applied to the specimen, a sufficient amount being used to impregnate all cells of the specimen and to cover the entire surface of the mount. A cover sheet of cellulose film or other suitable transparent material is placed over the specimen, and by digital manipulation, supplemented by pliant rollers or pads, the adhesive is distributed so as to seal the specimen between the mounting and the cover sheet and to more or less completely impregnate its cells. The solvent evaporates through the pores of the film.

The mounting is laid on a flat polished plate of metal or glass—preferably a mirror to make visible bubbles or other flaws that need to be eliminated in the manipulation after the cover sheet is applied. A tough, flexible transparent or highly translucent sheet impervious of water, such as commercial chlorinated rubber, and of larger area than the cover sheet, is preferably laid over it during manipulation to protect it from scratches and to prevent the excess adhesive, which is extruded, from coming into contact with the fingers or implements used in manipulation. If desired, a similar work-sheet may be placed on the plate before the mounting is laid on.

When distribution and impregnation are carried to the proper degree, the temporary work-sheet is removed and the laminated mount containing the specimen is dried for 2 to 24 hours, and is then washed with warm water and the outer surfaces quickly dried by blotting paper or by wiping with soft paper or other absorbent material.

The adhesive for impregnation of specimens and for binding the mounting and covering sheets to each other should, in the normally dry state, be plastic and as flexible as the mounting. It may employ a non-crystallizing viscous medium adapted to readily permeate the specimen (such as invert sugar syrup), an aqueous solution or suspension of a medium such as gelatin or isinglass, adapted to afford a body, and a plasticizer such as glycerol or sorbitol, and having a small amount of inert preservative, such as sodium benzoate. The proportions may be varied within wide limits to control adhesion, hydroscopiscity, flexibility, penetration, stability and volatile content.

It is sometimes desirable to temporarily mount specimens and keep them until they can be placed in a permanent mount. The dehydrated specimens are placed between two protecting sheets of material held together by a non-drying inert adhesive, e. g., one having more glycerine and less water.

The accompanying drawing shows, for purposes of illustrating the present invention, one of the many embodiments in which the invention may take form, it being understood that the drawing is illustrative of the invention rather than limiting the same.

In the drawing—

Fig. 1 is a front elevational view illustrating mounted specimens of flowers and the like;

Fig. 2 is a perspective view of the specimen shown in Fig. 1, showing the flexibility of the mount; and Fig. 3 is an enlarged cross-section on the line 3—3 of Fig. 1.

In Fig. 1 a leaf is indicated at 10 and two violets at 12 and 13, the stems being indicated at 14, 15 and 16.

The lower or mounting sheet is indicated at 17. It is here shown as a transparent sheet of cellulose film. The upper sheet is indicated at 18 and the interposed layer of adhesive at 19. The layer of adhesive is very thin and the two layers of cellulose film are held very close together. This adhesive impregnates all the cells of the specimen and covers the entire surface of the mount. It is free of bubbles and air pockets, and hence the specimen is preserved in place and can be seen by looking through the sheets of cellulose film. This film is flexible and can be bent and turned about as illustrated in Fig. 2.

The mounted specimens may be permanently and readily identified by numbers or other indicia applied to the upper surface of the mount 17. This may be readily done by a grease pencil, or the like, which leaves a mark unaffected by the adhesive and not removed during the latter steps of the mounting process.

For best results, one of the two sheets employed must permit the passage of vapor through it so that the adhesive may dry. The ordinary cellulose acetate film which is substantially water-resistant is sufficiently porous to vapors to permit the drying out of the adhesive before decomposition sets in.

A convenient way of supporting the mounted specimens for handling is to secure one edge of the cellulose sheets to a rigid or semi-rigid backing plate 20 by means of a strip of material indicated at 21. This backing plate is preferably a heavy sheet of cellulose film, preferably with the unpolished side up so as to facilitate writing.

What is claimed is:

1. The method of preserving the natural color in plant specimens, which comprises the steps of immersing fresh plant specimens in a bath, consisting of a non-bleaching anti-oxidant, an inert, non-penetrating liquid dehydrating agent, and a color and tissue setting compound, thence drying the impregnated specimens, and mounting.

2. The method of preserving the natural color in plant specimens, which comprises the steps of immersing fresh plant specimens in a bath, consisting of thiourea, sorbitol and sodium borophosphate, thence drying the impregnated specimens, and mounting.

GEORGE R. FESSENDEN.